US009786202B2

(12) United States Patent
Huang et al.

(10) Patent No.: US 9,786,202 B2
(45) Date of Patent: Oct. 10, 2017

(54) ROBOT ASSISTED SURGICAL TRAINING (75) Inventors: Weimin Huang, Singapore (SG); Jiang Liu, Singapore (SG); Jiayin Zhou, Singapore (SG); Jing Zhang, Singapore (SG); Beng Hai Lee, Singapore (SG); Wing Kee Wong, Singapore (SG); Ngan Meng Tan, Singapore (SG); Zhuo Zhang, Singapore (SG); Fengshou Yin, Singapore (SG); Stephen Chang, Singapore (SG); Chee Kong Chui, Singapore (SG); Yi Su, Singapore (SG)

(73) Assignees: Agency for Science, Technology and Research, Singapore (SG); National University Hospital (S) Pte Ltd., Singapore (SG); National University of Singapore, Singapore (SG)

( * ) Notice: Subject to any disclaimer, the term of this patent is extended or adjusted under 35 U.S.C. 154(b) by 835 days.

(21) Appl. No.: 13/582,907

(22) PCT Filed: Mar. 4, 2011

(86) PCT No.: PCT/SG2011/000087
§ 371 (c)(1),
(2), (4) Date: Feb. 18, 2013

(87) PCT Pub. No.: WO2011/108994
PCT Pub. Date: Sep. 9, 2011

(65) Prior Publication Data
US 2013/0196300 A1    Aug. 1, 2013

(30) Foreign Application Priority Data

Mar. 5, 2010 (SG) .............................. 201001593-1
Sep. 1, 2010 (SG) .............................. 201006367-5

(51) Int. Cl.
*G09B 23/28* (2006.01)
*G09B 23/30* (2006.01)

(52) U.S. Cl.
CPC ............. *G09B 23/28* (2013.01); *G09B 23/30* (2013.01)

(58) Field of Classification Search
CPC ...... G09B 23/28; G09B 23/26; G09B 23/281; G09B 23/283; G09B 23/285; G09B 23/286; G09B 23/288; G09B 23/303
(Continued)

(56) References Cited

U.S. PATENT DOCUMENTS 5,704,791 A * 1/1998 Gillio ............................ 434/262
2004/0009459 A1 * 1/2004 Anderson et al. ............ 434/262
(Continued)

OTHER PUBLICATIONS

Voyles et al., "A Practical Approach to Laparoscopic Cholecystectomy," The American Journal of Surgery, 1991, vol. 161, Issue 3, pp. 365-370, Mar. 1991.
(Continued)

*Primary Examiner* — Timothy A Musselman
(74) *Attorney, Agent, or Firm* — Conley Rose, P.C.

(57) ABSTRACT

A surgical training system and method. The system comprises means for recording reference data representing a reference manipulation of a computer generated model of an object by a master user; means for physically guiding a trainee user based on the recorded reference data during a training manipulation of the model of the object by the trainee user; and means for recording assessment data representing an assessment manipulation of the model of the object by the trainee user without guidance.

23 Claims, 7 Drawing Sheets

(58) Field of Classification Search
USPC .................................................. 434/262–275
See application file for complete search history.

(56) References Cited

U.S. PATENT DOCUMENTS

| | | | |
|---|---|---|---|
| 2005/0142525 A1 | 6/2005 | Cotin et al. | |
| 2006/0178559 A1* | 8/2006 | Kumar | A61B 34/30 600/109 |
| 2007/0172803 A1 | 7/2007 | Hannaford et al. | |
| 2012/0225413 A1* | 9/2012 | Kotranza et al. | 434/262 |

OTHER PUBLICATIONS

Simbionix, "Lap Mentor II." [Online] http://simbionix.com/simulators/lap-mentor.

Immersion, "The LaparoscopyVR Virtual-Reality System," [Online] http://ir.immersion.com/releasedetail.cfm?ReleaseID=247425. [Online] http://www.caehealthcare.com/eng/surgical-simulators/lapvr.

Baheti et al., "RoSS: Virtual Reality Robotic Surgical Simulator for the da Vinci Surgical System," in Symposium on Haptic Interfaces for Virtual Environments and Teleoperator Systems, pp. 479-480, Mar. 2008.

Red Llama, "SimPraxis Laparoscopic Cholecystectomy Trainer," Copyright 2013 Red Llama Store. [Online] http://redllamastore.com/products/simpraxis-laparoscopic-cholecystectomy-trainer.

Intuitive Surgical Inc., "The da Vinci Surgical System" [Online] http://www.intuitivesurgical.com/products/davinci_surgical_system.

Mentice, "XitactTM IHP Instrument Haptic Port." [Online] http://www.virtualsurgery.vision.ee.ethz.ch/Xitact/LapChole. In this regard, a publication, by the product's inventors, is included: Baur et al., "Virgy: A Virtual Reality and Force Feedback based Endoscopic Surgery Simulator."

Wen et al., "Robotic Assistants Aid Surgeons during Minimally Invasive Procedures," IEEE Engineering in Medicine and Biology Magazine, Jan./Feb. 2001, vol. 20, Issue 1, pp. 94-104.

Hansen et al., "Intraoperative Adaption and Visualization of Preoperative Risk Analyses for Oncologic Liver Surgery," SPIE Medical Imaging:Visualization, Image-Guided Procedures, and Modeling (SPIE MI), vol. 6918, 2008, pp. 69182_1 to 9.

Kanumuri et al., "Virtual Reality and Computer-Enhanced Training Devices Equally Improve Laparoscopic Surgical Skill in Novices," JSLS, Journal of the Society of Laparoendoscopic Surgeons Jul.-Sep. 2008;12(3):219-26.

Delingette et al., "Hepatic Surgery Simulation," Communications of the ACM, vol. 48, No. 2, Special Issue: Medical Image Modeling Tools and Applications, Feb. 2005, pp. 31-36.

Cotin et al., "Real-Time Elastic Deformations of Soft Tissues for Surgery Simulation," IEEE Transactions on Visualization and Computer Graphics (TVCG), vol. 5, No. 1, 1999, pp. 62-73.

Ritter et al., "Real-Time Illustration of Vascular Structures," IEEE Transactions on Visualization and Computer Graphics Journal (IEEE Visualization), 12(5), Sep./Oct. 2006, pp. 877-884.

Hansen et al., "Simultaneous Visualization of Preoperative Planning Models and Intraoperative 2D Ultrasound for Liver Surgery," Proceedings of Eurographics, Short Papers, Prague, Czech Republic, Sep. 2007, pp. 117-120.

Kuhnapfel et al., "Endoscopic Surgery Training using Virtual Reality and Deformable Tissue Simulation," Computers and Graphics 24, 2000, pp. 671-682.

Webster et al., "Elastically Deformable 3D Organs for Haptic Surgical Simulation," Medicine Meets Virtual Reality 2002, pp. 570-572.

Tendick et al., "A Virtual Environment Testbed for Training Laparoscopic Surgical Skills," Presence, vol. 9, Issue 3, Jun. 2000, pp. 236-255.

Georgii et al., "Mass-Spring Systems on the GPU," Simulation Modeling Practice and Theory, vol. 13, Jul. 7, 2005, pp. 693-702.

Mosegaard et al., "A GPU Accelerated Spring Mass System for Surgical Simulation," Studies in Health Technology and Informatics, vol. 111, 2005, pp. 342-348.

Taylor et al., "High-Speed Nonlinear Finite Element Analysis for Surgical Simulation using Graphics Processing Units," IEEE Transactions on Medical Imaging, vol. 27, No. 5, May 2008, pp. 650-663.

Qin et al., "Learning Blood Management in Orthopedic Surgery through Gameplay," IEEE Computer Graphics and Applications, vol. 30, No. 2, 2010, pp. 45-57.

Engel et al., "Gallbladder Wall Thickness: Sonographic Accuracy and Relation to Disease," in American Journal of Roentgenology, 1980, pp. 907-909.

Fung et al., "Biomechanics: Mechanical Properties of Living Tissues," Springer, Berlin Germany, second edition, pp. 242-277, 1993.

Maurel et al., "Biomechanical Models for Soft Tissue Simulation," Springer, Berlin Germany, pp. 1-23, 1998.

Deussen et al., "Using Simulated Annealing to Obtain Good Nodal Approximations of Deformable Bodies," In Proceedings of Eurographics Workshop on Computer Animation and Simulation, 1995, pp. 30-43.

Luo et al., "On the Mechanical Behavior of the Human Biliary System," World J Gastroenterol 2007, vol. 13, No. 9, pp. 1384-1392.

Agency for Science, Technology and Research et al., Written Opinion of the ISA mailed May 4, 2011, PCT App. No. PCT/SG2011/000087.

Agency for Science, Technology and Research et al., International Search Report mailed May 4, 2011, PCT App. No. PCT/SG2011/000087.

\* cited by examiner

(a) CT images  (b) Mesh model built from (a)

ROBOT ASSISTED SURGICAL TRAINING

FIELD OF INVENTION

The present invention broadly relates to a system and method for robot assisted surgical training.

BACKGROUND

Training of skills involving handling or otherwise manipulating objects in many if not all cases involves a "master-apprentice" strategy where a trainee learns the relevant skill by repeating the steps as performed by a master after having observed his/her master perform the task several times. For example, surgical training has always been one of the most important components in a surgeon's career development. Traditionally, surgical training is done with the "master-apprentice" strategy. Sometimes the master teaches the trainee hand-in-hand in order to show the trainee the subtle movements. With the increasing complexity of surgical operations nowadays, it becomes increasingly dangerous for the trainee to "learn" while operating on a real patient despite being supervised during the operation.

Existing surgical training is typically developed based upon patients with "standard" anatomical structures. The current training is usually a self-directed learning process using a standard model and procedure. However, every patient is different. In practice, a wide variety of patient anatomical structures can be observed. Using the existing training simulators, the trainee surgeon thus has limited exposure to patients with anatomical structures that differ from the normal population.

Currently, most of the digital training systems use a generic model for cholecystectomy with a fixed elastic model and with or without force feedback to simulate the surgery procedure. Most successful applications for liver surgery are using 3D visualization for surgical planning.

There are simulation training instruments that allow the trainees to "dry-run" on standard operations with fixed operative scenarios. These instruments therefore lack the variety of difficult operative situations found in real-life. In addition, certain maneuvers performed by an experienced surgeon that are required for such situations cannot be easily taught to the trainee. A survey of existing literature and systems follows below.

LAP Mentor [1] is developed by SimBionix. LAP Mentor provides simulation to practise the Fundamentals of Laparoscopic Surgery (FLS) skills required for laparoscopic surgery for new and experienced surgeons. LAP Mentor comes with haptic feedback, realistic visualization and a variety of training curricula. LAP Mentor is a model-based training system, heavily on self-practice to reach a desired proficiency.

SimPraxis [2] is a product of Red Llama, Inc. to teach surgical concepts and procedures. SimPraxis is a software-based interactive program running on a PC. With video, audio and written scripts, prompts, hints, references and materials. SimPraxis illustrates the steps with actual procedure.

LaparoscopyVR [3] is an interactive, high-fidelity surgical trainer that allows surgeons to practise FLS skills. LaparoscopyVR provides a training curriculum to practise the removal of gallbladder from the liver bed including identifying, clipping, cutting, and removing the gallbladder. The generic liver and gallbladder models are embedded in the system and haptic force feedback is also integrated.

A liver surgery simulation is developed by Herve Delingette [4]. The liver surgery simulation uses patient-specific data (Computed Tomography (CT) images) to construct the 3D model. More specifically, the physical model (soft tissue model) is developed using a linear and quasi-linear elastic model. To provide real time deformation and visualization, pre-computation is carried out which takes a few minutes to several hours depending on the number of mesh vertices on a PH 450M PC. The pre-computed result is then stored in a file for real time deformation and visualisation.

Mevis Research has a wide spectrum of medical image research on medical image analysis, visualization, and surgery planning [5, 6, 7]. Mevis Medical Solutions is a world pioneer in liver surgery planning service for liver visualization and planning proposal. In liver surgery, an intraoperative adaptation of preoperative planning using 2D ultrasonic data has been proposed. In planning service for live surgery, Mevis can also supply the liver model to customers in several days.

However, such patient-specific systems still lack incorporation of master feedback to better emulate the "master-apprentice" strategy which remains a fundamental characteristic of for example surgical training.

Example embodiments of the present invention therefore seek to provide a method and system that seek to address at least one of the above mentioned problems.

SUMMARY

In accordance with a first aspect of the present invention there is provided a surgical training system comprising means for recording reference data representing a reference manipulation of a computer generated model of an object by a master user; means for physically guiding a trainee user based on the recorded reference data during a training manipulation of the model of the object by the trainee user; and means for recording assessment data representing an assessment manipulation of the model of the object by the trainee user without guidance.

The system as claimed may further comprise processing means for generating the model of the object.

Said processing means may be configured to generate a case specific model of the object based on patient data.

The processing means may comprise an image processing module for generating the model of the object based on images of a corresponding real object.

The images may comprise medical images for surgical training.

The means for recording the reference data, the means for guiding the trainee user, and the means for recording the assessment data may together comprise one or more robotic devices.

The one or more robotic devices may be configured to be coupled to a tool used in the manipulation of the model of the object.

The one or more robotic devices may be configured to be coupled to the master user or the trainee user via the tool.

The system may further comprise means for evaluating the assessment data

The means for evaluating may be configured to evaluate the assessment data based on the reference data.

The means for evaluating may be configured to evaluate the assessment data based on one or more motion parameters.

The motion parameters may comprise one or more of a group consisting of maneuver route, speed, force, and time.

In accordance with a second aspect of the present invention there is provided a robot assisted surgical training method comprising the steps of recording reference data representing a reference manipulation of a computer generated model of an object by a master user; physically guiding a trainee user using a robotic device based on the recorded reference data during a training manipulation of the model of the object by the trainee user; and recording assessment data representing an assessment manipulation of the model of the object by the trainee user without guidance.

The method may further comprise generating the model of the object.

Generating the model of the object may comprise generating a case specific model of the object based on patient data.

The method may comprise generating the model of the object based on images of a corresponding real object.

The images may comprise medical images for surgical training.

Recording the reference data, guiding the trainee user, and recording the assessment data may comprise using one or more robotic devices.

The one or more robotic devices may be configured to be coupled to a tool used in the manipulation of the model of the object.

The one or more robotic devices are configured to be coupled to the master user or the trainee user via the tool.

The method may further comprise evaluating the assessment data.

Evaluating the assessment data may be based on the reference data.

Evaluating the assessment data may be based on one or more motion parameters.

The motion parameters may comprise one or more of a group consisting of maneuver route, speed, force, and time.

In accordance with a third aspect of the present invention there is provided a data storage medium having computer code means for instructing a computer to implement a robot assisted surgical training method as defined in the second aspect.

BRIEF DESCRIPTION OF THE DRAWINGS

Embodiments of the invention will be better understood and readily apparent to one of ordinary skill in the art from the following written description, by way of example only, and in conjunction with the drawings, in which:

FIGS. 3a) and b) illustrate original CT images and the shape model built from CT data respectively, according to an embodiment.

FIGS. 7a) and b) are schematic drawings illustrating a robot for use in the system of FIG. 1.

FIGS. 8a), b) and c) show the initial position of an organ surface, the inner surface obtained after 15 iterations, and the inner surface obtained after 30 iterations of a multi-layer mass-spring model implementation for shrinking a 3D mass surface from a skeleton surface of a gallbladder mass surface, for use in the system of FIG. 1.

FIGS. 9a), b), c), and d) are images illustrating a construction process for a virtual gallbladder extracted from a CT data set, for use in the system of FIG. 1.

DETAILED DESCRIPTION

To cater to the needs of patient-oriented training and to enable apprentice surgeons to learn the skills from master surgeons, the described example embodiments provide the architecture of an Image-Guided Robot Assisted Surgical (IRAS) training system which integrates modules to simulate the patient's organs (such as liver and gallbladder) deformation and to mimic the master surgeon's operation maneuver by a robotic system, which then enables apprentice surgeons to learn and evaluate the apprentice surgeon's performance in a realistic virtual environment. Embedding the "experience" of master surgeon's operation (parameterized by a robotic system) into a specific model advantageously enriches the trainees' knowledge and can shorten the learning curve by watching and feeling the trainer's operation.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The IRAS training system in the described embodiments can advantageously solve the inadequacies of training discussed previously. The example embodiments provide an intelligent computational solution that incorporates the experienced surgeons' expertise to guide and evaluate the surgical training. The integrated solution embeds a master surgeon's experience and feedback together through a robot with a patient-specific model for training. A database comprising patient-specific images and digital models is advantageously used in the provisioning of training for patients with anatomical structure different from the normal population. Advantageously, master surgeons' experience (e.g. movement trails) can also be associated with the patient-specific model and stored in the database that can be used for guidance of apprentice surgeons.

Figure 1:
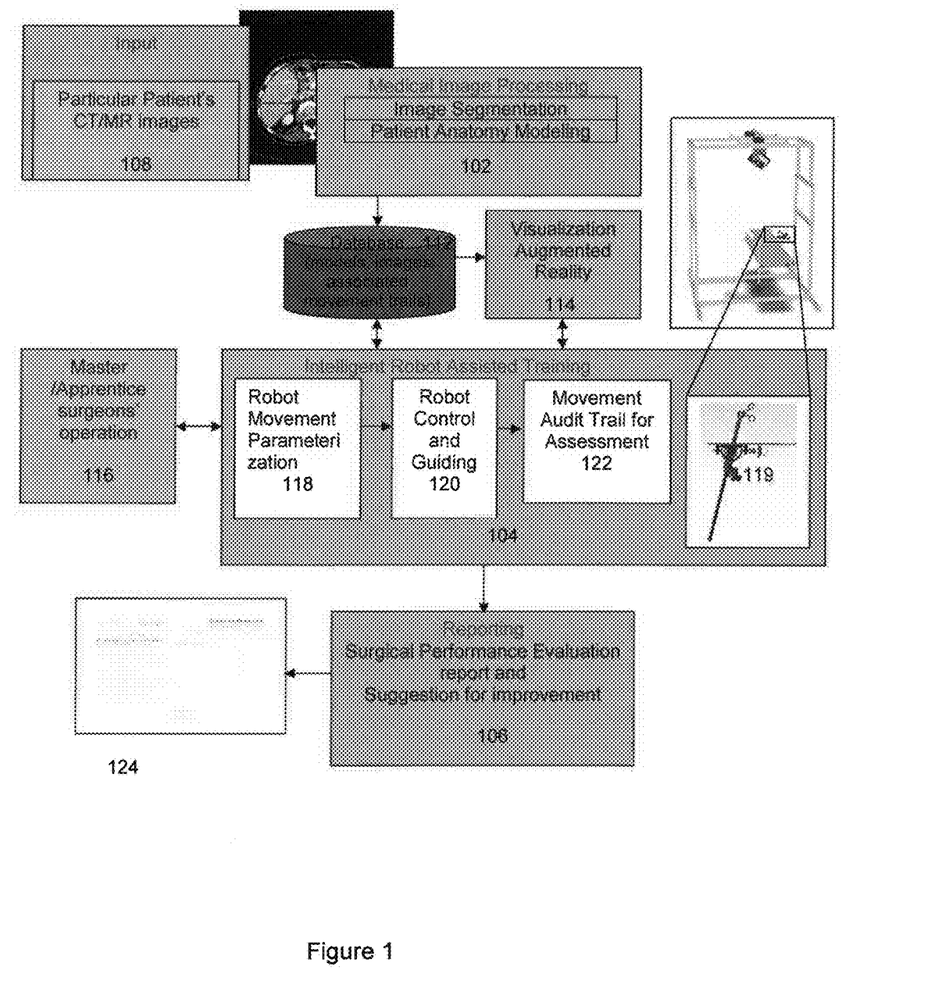
FIG. 1 illustrates an architecture of an Image-Guided Robot Assisted Surgical (IRAS) system, according to an embodiment.

FIG. 1 illustrates an architecture of an IRAS system 100, according to an embodiment. IRAS consists of three modules: the Image Processing Module 102, the Intelligent Robot Assisted Training Module 104 and Trainee Performance Analysis Module 106.

A patient-specific 3D model is developed from patient's CT and/or Magnetic Resonance Imaging (MRI) images 108. However, the present invention is not limited to developing the patient-specific model based on CT and/or MRI images, and the patient-specific models can be developed based on other techniques such as Magnetic Resonance Elastography (MRE) can be used to measure the organ mechanic properties in different embodiments. A database 112 storing models, images, and associated movement trails is utilised. Medical image processing including image segmentation, patient anatomy modeling and augmented reality 114 are conducted on the images. The simulation of the surgery is displayed on a normal computer touch screen in this embodiment, but it will be appreciated that other displaying technique/devices may be used in different embodiments. A training scenario is developed from the patient-specific model with the master surgeon performing the surgery 116 through parameterizing the movement for the robot 118. The robot, here in the form of a robot arm 119, will then repeat the master surgeon's movement to assist the trainee to perform the surgical scenario through control and guidance 120. The trainee will then be allowed to perform the surgery independently. Movement audit trails are recorded for future assessment 122. The Trainee Performance Analysis Module 106 will then assess the competency of the trainee by automatically generating a surgical performance evaluation report and suggestions for improvement, indicated at numeral 124.

A multi-layer mass-spring modelling method was used in the example embodiment to construct patient's organ elastic model. The patient's organ was first segmented from clinical CT images. From the segmentation result, a surface mesh of the patient's organ was constructed. The inner layers of a mass-spring model were generated from the surface mesh. The multi-layer elastic model based on the anatomical structure of the organ was subsequently constructed. Thus, a truly patient-specific organ model that appropriately approximates the geometrical shape as well as some mechanical characteristics of the patient's organ is advantageously used in the example embodiment. More details of the multi-layer mass-spring modeling method will be described below.

The development of the robotic module 104 in example embodiments can involve design, implementation and integration of multiple collaborative surgical robots, of which the robot arm 119 is merely one example, as will be appreciated by a person skilled in the art. The module 104 provides training outside of the operating theatre for mastery of the basic technical skills. The robotic module 104 helps train doctors to imitate the motion conducted by senior surgeons.

Robot instructors are developed to assist the human instructors. The robot instructors consist of three components in an example embodiment: recording, guiding and assessment components 118, 120, and 122. Patient-specific training modules are constructed for various purposes of training. A senior surgeon operates the robot 119 and the motion is tracked and recorded in the system 100. The robot 119 is preferably configured to track and record the motion of the senior surgeon's hand. In the training mode, the robot 119 guides the trainee's hand and/or tool, here a surgical device, in repeating the surgeon's motion. As part of the assessment component 122, the trainee performs the surgery independently but with his/her motions tracked.

The Trainee Performance Analysis Module 106 evaluates the amount of deviation of the trainee's motion from the trainer's motion and analyzes the efficacy of the Training Module 104. The module 106 assesses the competency of the trainee by generating a surgical performance evaluation report and suggestions for improvement automatically. The key factors in example embodiments are one or more motion parameters (maneuver route, speed, force, and time) recorded during the practice.

One or more organ models can be generated as generic models which can be used for fundamental skill training. However in order to have the system 100 personalized according to patient-specific data, an automatic soft tissue modeling is employed in example embodiments to construct patient-specific models.

Figure 2:
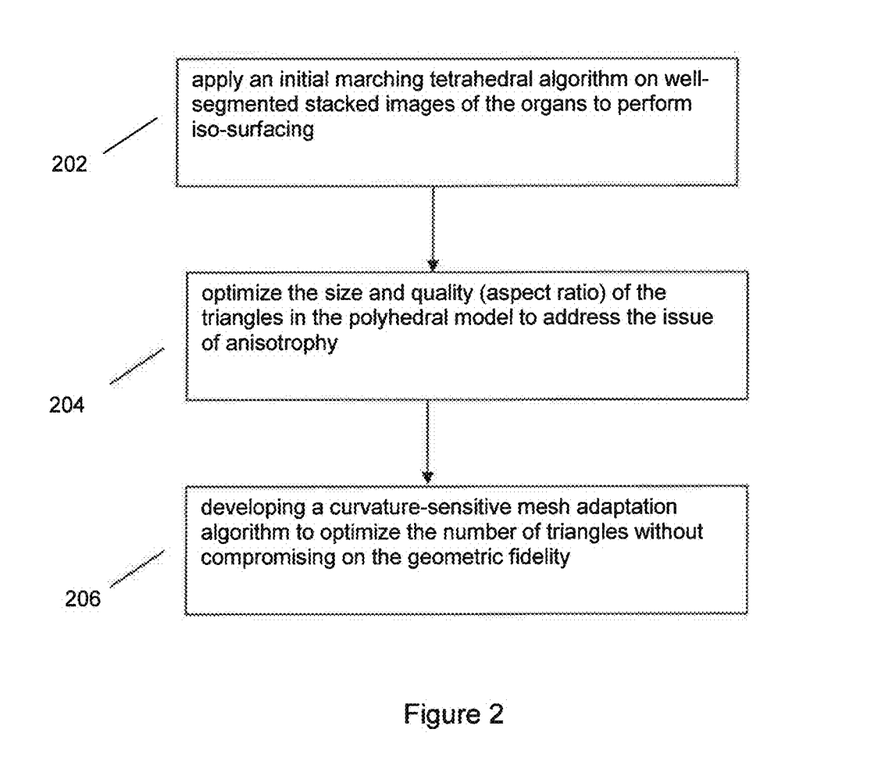
FIG. 2 shows a flowchart illustrating provisioning of a 3D model for surgical training, according to an example embodiment.
Figure 3:
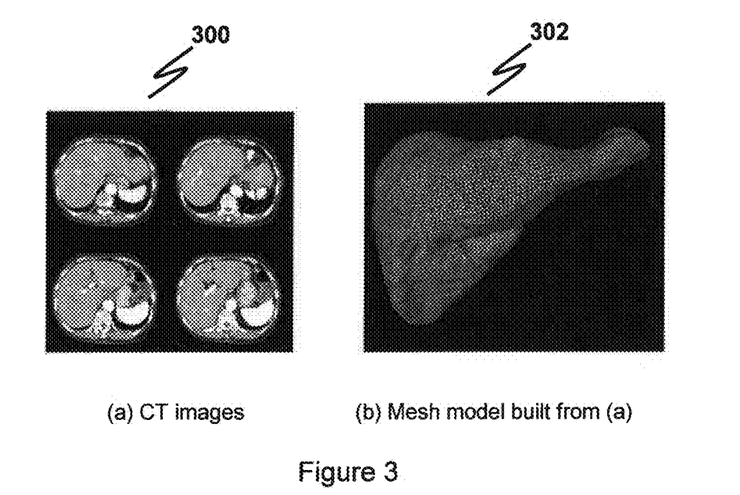

It has been recognized by the inventors that there are preferably several sub-tasks to the provisioning of a useful 3D model for surgical training, as illustrate in FIG. 2. One task involves the construction of a high quality 3D polyhedral model for real-time visualization. To achieve this, the example embodiments work on well-segmented stacked images of the organs and apply an initial marching tetrahedral algorithm to perform the iso-surfacing, 202. This method is superior to the conventional marching cube since the method can avoid issues with ambiguous configuration. The next step 204 is to optimize the size and quality (aspect ratio) of the triangles in the polyhedral model to address the issue of anisotrophy. This is due to the large inter-slice distance as compared to the pixel size of the scanned image. The next step 206 involves developing a curvature-sensitive mesh adaptation algorithm to optimize the number of triangles without compromising on the geometric fidelity. FIGS. 3a) and b) illustrates original CT images 300 and the shape model 302 built from CT data respectively, according to an embodiment. The patient-specific elastic model is constructed on the mesh model obtained.

Figure 7:
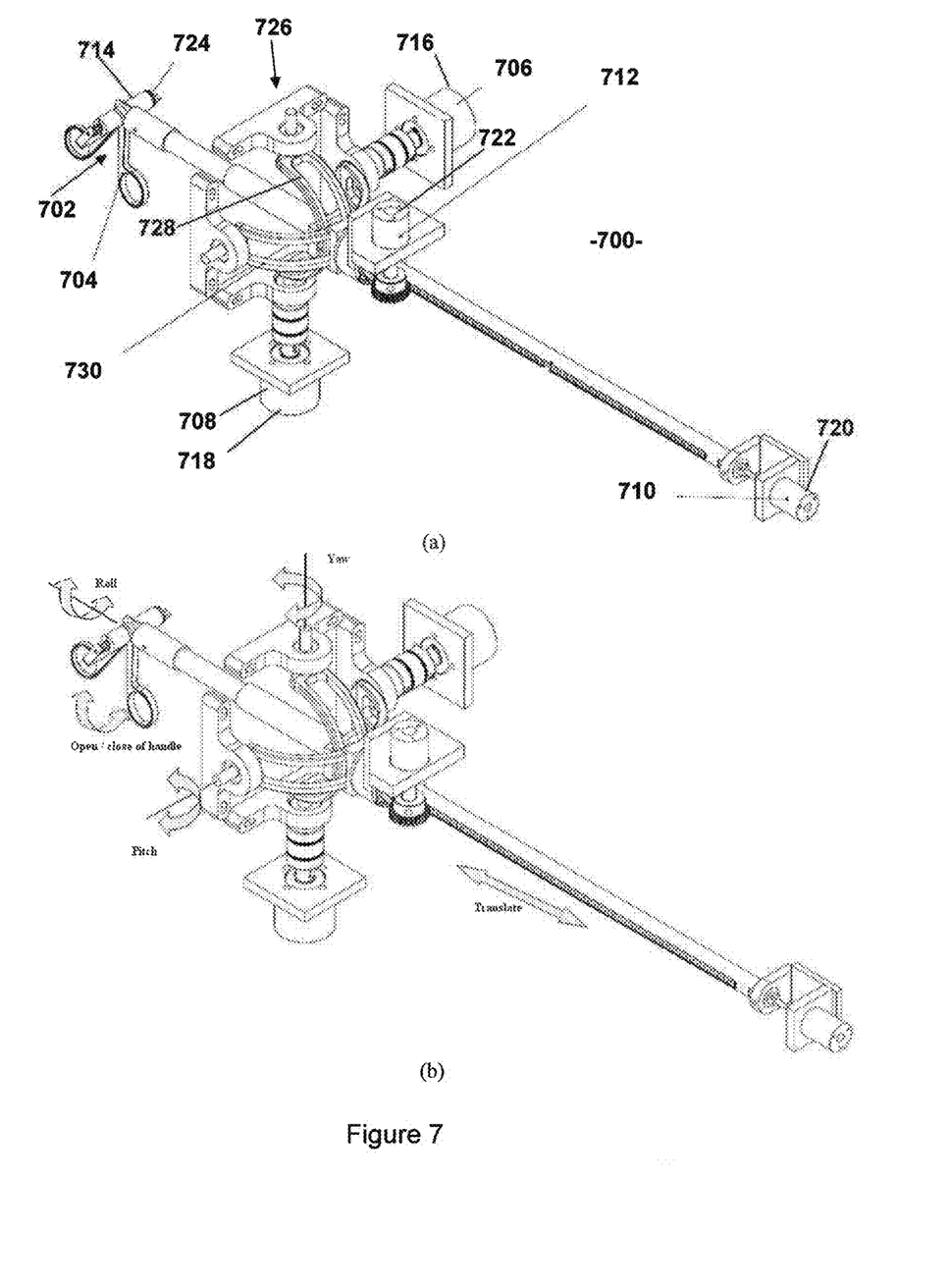

Returning to FIG. 1, delivery of the surgical training in example embodiments is achieved via the Intelligent Robot Assisted Training Module 104. Precise resection can be performed by the surgeon using different instruments tracked by a robot. The robot e.g. 119 is capable of repeating the recorded motion with the different instruments. One or more robots can be used for manipulating the different instruments. Central to the robotic system in the example embodiment is a computer control system coordinating the various component robots. The robot e.g. 119 also plays an instructor role in the training system 100. A Robotic Surgical Trainer 700, as depicted in FIGS. 7a) and b), as part of the IRAS system, is designed to learn from the master surgeon, and interact with the trainee surgeon to teach him/her the skills from the master surgeon.

There are four modes of operation for the Robotic Surgical Trainer 700, namely Record, Replay, Robotic assisted teaching, and Trainee mode. A patient specific anatomical model generated by image processing techniques is loaded in the IRAS system. All four operation modes work on the virtual patient specific anatomical model.

In Record mode, the robot 700 is passively operated by the master surgeon. A surgical tool 702 incorporated into the robot 700 is operated by the user manually. Motion of the surgical tool 702 is decoupled into roll, pitch, yaw, translation and open/close of tool tip. All this information are recorded to reconstruct the trajectory of the surgical tool 702. In order to provide the user with realistic sensation (haptic), a control system/ controller is used to generate the sensation of tool-environment interaction based on the tissue's biomechanics model, in an example embodiment.

In the Replay mode, the robot 700 actively drives the surgical tool 702. The trainee surgeon can hold the handle 704 of the surgical tool 702, and follow the trajectory of the surgical tool 702 to learn the procedure of a recorded surgery.

The Robotic assisted teaching mode is for a trainee surgeon who has gained confidence from the Replay mode. The trainee surgeon is allowed to operate on the patient specific anatomical model with the surgical procedure learnt in Replay mode. The trajectory of the surgical tool 702 will be tracked. In the meantime, this trajectory will be compared to the trajectory acquired in Record mode, i.e. where the surgical tools 702 was operated by the master surgeon.

If the difference between the trajectory recorded for the trainee surgeon in the robot assisted teaching mode and the trajectory acquired in Record mode and Robot assisted teaching mode was exceeds a predefined range, the robot could force the surgical tool to follow the trajectory acquired in Record mode. In the Robot assisted teaching mode, the trainee surgeon is given some freedom to perform the surgery with learnt procedures.

The Trainee mode allows the trainee surgeon to operate on the anatomical model with the learnt surgical procedure on his/her own accord. The motion of the surgical tool is recorded for evaluation purpose. In this mode, actuators incorporated in the robot 700 provide haptic feedback in the same manner as in the Record mode.

In the robot 700, a plurality of DC motors 706, 708, 710, 712, 714, and associated encoders 716, 718, 720, 722, and 724 are incorporated to implement 4 degrees of freedom (DOR in addition to an open/close function of the surgical tool 702. The DC motors 706, 708, 710, 712, and 714 can be programmed to output tourque and rotation to drive the respective joints of the robot 700 to deliver accurate physical motion guidance to the trainee surgeon. At the same time, the rotatory encoders 716, 718, 720, 722, and 724 can acquire the trajectories of the respective joints when the DC motors 706, 708, 710, 712, and 724 are back driven in the Record and Trainee modes.

A spherical mechanism 726 is incorporated into the robot 700 to decouple the orientation of the surgical tool 702 body into a spherical coordinate. The orientation of the tool 702 body is expressed as pitch and yaw in terms of degree/radiant. The movement of the tool 702 body drives to rotate the spherical arches 728, 730 at respective angels. The spherical arches 728, 730 are connected to the shafts of the DC motors 708, 706, and rotatory encoders 718, 716 are respectively mounted on the shaft ends of the DC motors 708, 706.

A mechanism for translational and rotational motion of the surgical tools 702 is implemented by DC motors 710, 712, and the motion can be tracked by rotatory encoders 720, 722. Rack and pinion can be applied to obtain the transformed of the translational/rotational motion. The DC motor 714 and associated encoder 724 are incorporated in the robot 700 to provide a mechanism for open/close movement of the handle 704 of the surgical tool 702.

In order to develop and incorporate for example valid laparoscopic tasks to train and assess laparoscopic skill, five tasks have been identified to be particularly relevant. The common tasks that are derived from laparoscopic surgery include pick and place, withdraw and insert and cutting pattern, which are integrated into a patient-specific augmented reality environment, in an example embodiment.

Figure 4:
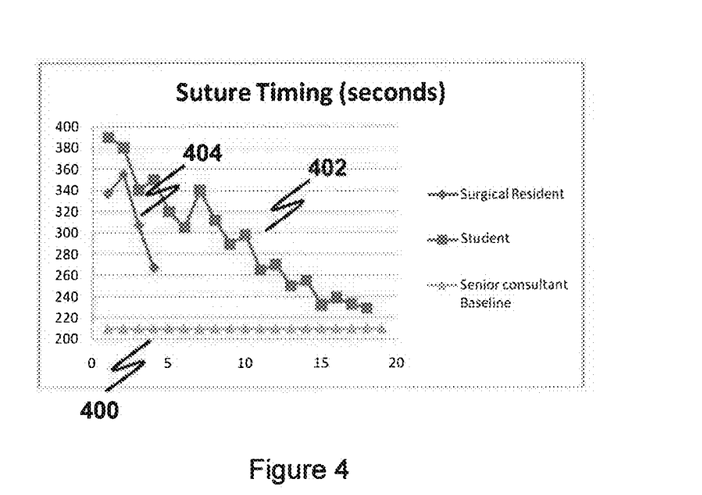
FIG. 4 shows a graph illustrating progress of suture timing of a surgical resident, student, and senior consultant, according to use of an example embodiment.

Evaluation of the training is done by comparison of movement trails operated by the trainee and the master surgeon using the Training Module 104. One or more of the time, speed, force and maneuver route are the parameters to be recorded and compared in example embodiments. Results from an initial experiment are illustrated in FIG. 4. The graph illustrates that the suture timing is stable for performance of the senior consultant surgeon, curve 400. Over multiple practices, the performance of an undergraduate engineering student (curve 402) advantageously could approach and plateau against the performance baseline set by the senior consultant surgeon. While initial timings were noted to be worse than the surgical resident (curve 404), the student's performance advantageously managed to become on par with the surgical resident after an additional five (5) practices.

Compared with existing approaches the described embodiments provide a robotic-assisted training system used for both training and planning of for example cholecystectomy and liver surgery. By integrating the patient-specific model and robotic assistive learning, the example embodiments aim to advantageously provide surgeons a realistic simulation platform for practice, learning and planning.

Advantageously, the example embodiments provide for the tight coupling of the clinical processes with a seamless integration of the three main technological modules, namely the patient-specific anatomy modeling module from patient-specific data, the intelligent robot assisted surgical training module and trainee performance analysis module, under the context of image-guided robot-assisted training.

Figure 8:
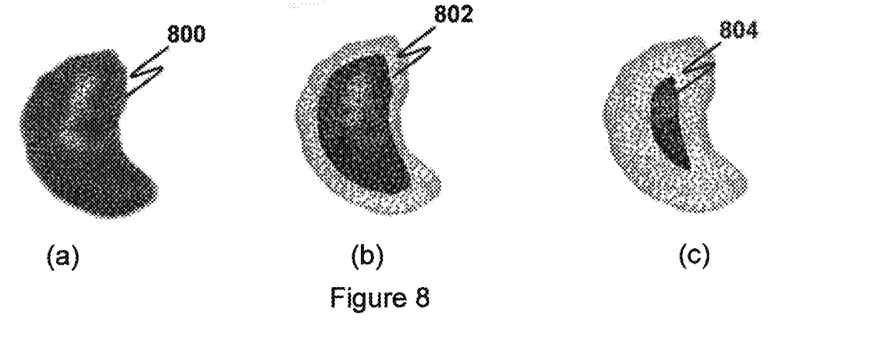

Each individual module can contribute to facilitating the synthesis of an image-guided robot-assisted training system. For example, the 3D abdominal organ modelling provides for simulation of large deformation of the organs modelled. A multi-layer mass-spring model is used in the example embodiment, but the presentation is not limited to that model. In the model used, a Gaussian filter was used to obtain a skeleton surface of the gallbladder mesh surface. It was used to shrink the 3D mesh surface of the segmented organ surface. By setting the number of iterations, different 3D inner surfaces were obtained. The generated inner surfaces were deemed as the inner layers in the desired multi-layer structure. The inner layers obtained using the new method are shown in FIG. 8. More particular, FIG. 8(a) shows the initial position of the organ surface 800, (b) shows the inner surface 802 obtained after 15 iterations and (c) shows the inner surface 804 obtained after 30 iterations. To construct the elastic model, the first two-layer structure was used to model the biomechanical behavior of the organ wall and the remaining structure was used to model the inner fluid behavior. The multi-layer mass-spring model was automatically constructed based on the surface meshes using the following steps:

Every triangle in the upper surface projected its centroid in the normal direction to hit the lower surface layer.
The intersection points were used as the mass vertices in the lower layer.
Springs were added to connect those vertices in the original triangle and its projected centroid. A tetrahedral mesh structure between the next two surface layers was thus constructed.
A triangulation process was carried on these projected centroids.
Similar procedures were iterated for the lower layers until all the layers were processed.

Figure 9:
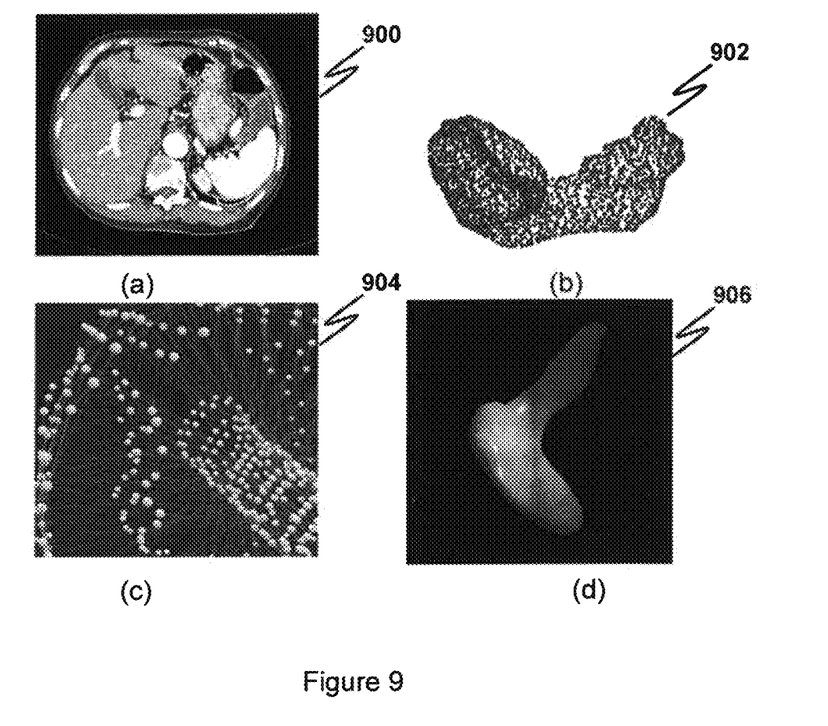

FIG. 9 shows a complete construction process for a virtual gallbladder extracted from a CT dataset. More particular, FIG. 9(a) shows one image 900 of a set of original 2D CT images with gallbladder contour. FIG. 9(b) shows the mesh surface 902 extracted from the segmentation results. FIG. 9(c) shows the constructed multi-layer mass-spring model 904. FIG. 9(d) shows the textured gallbladder 906.

The collaborative robot control preferably uses designs of robot kinematics in consideration of workspace manipulation, operation mechanism, and safety in surgery. Innovation in robotic hardware and control is required in order to have meaningful coexistence between the robot trainers and the surgery trainees. The robotic system advantageously also has the capability to memorize "experience" (time, speed, force and route) of the master surgeons based on the patient-specific model. The reporting and evaluation is thus not only based on fixed parameters but also on data gained from experienced surgeons.

Figure 5:
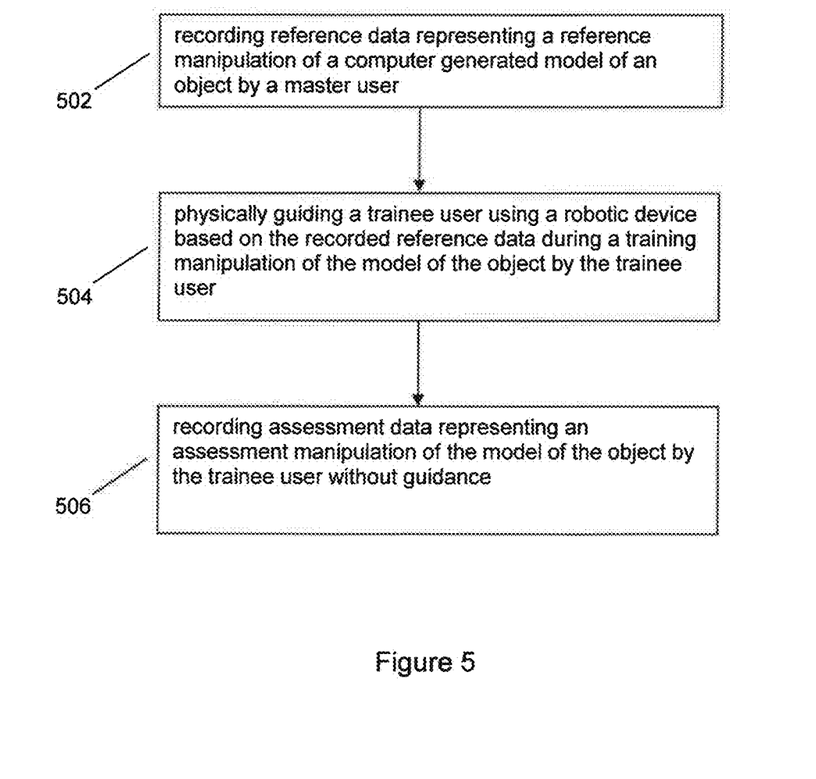
FIG. 5 shows a flow chart illustrating a method for robot assisted surgical training, according to an embodiment.

FIG. 5 shows a flow chart 500 illustrating a method for robot assisted training, according to an embodiment. At step 502, reference data representing a reference manipulation of a computer generated model of an object by a master user is recorded. At step 504, a trainee user is physically guided using a robotic device based on the recorded reference data during a training manipulation of the model of the object by the trainee user. At step 506, assessment data representing an assessment manipulation of the model of the object by the trainee user without guidance is recorded.

The example embodiments utilize medical image processing, modelling of patient data, augmented reality for robotic training and assessment from comparison with master surgeon's skills for laparoscopy surgical training, with one or more of the following features:

Offering tight coupling of clinical processes with a seamless integration of image processing, and a patient-specific anatomy modeling module, the intelligent robot assisted surgical training module, and trainee performance evaluation module.
Integration of patient-specific models into a training system for surgeons and trainees to practise with increased exposure to a variety of specific operation situations, as well as generic skills.
Offering a truly patient-specific organ model that appropriately generates the geometrical shape as well as mechanical characteristics of the patient's organ adapted from generic mechanical models.
Offering a robot model that is able to learn from a master surgeon for patient-specific surgery, and guide and evaluate the trainee's practice.

Embodiments of the present invention can have other applications than the ones described herein, for example a patient-specific pretreatment planning system can be developed in different embodiments.

Figure 6:
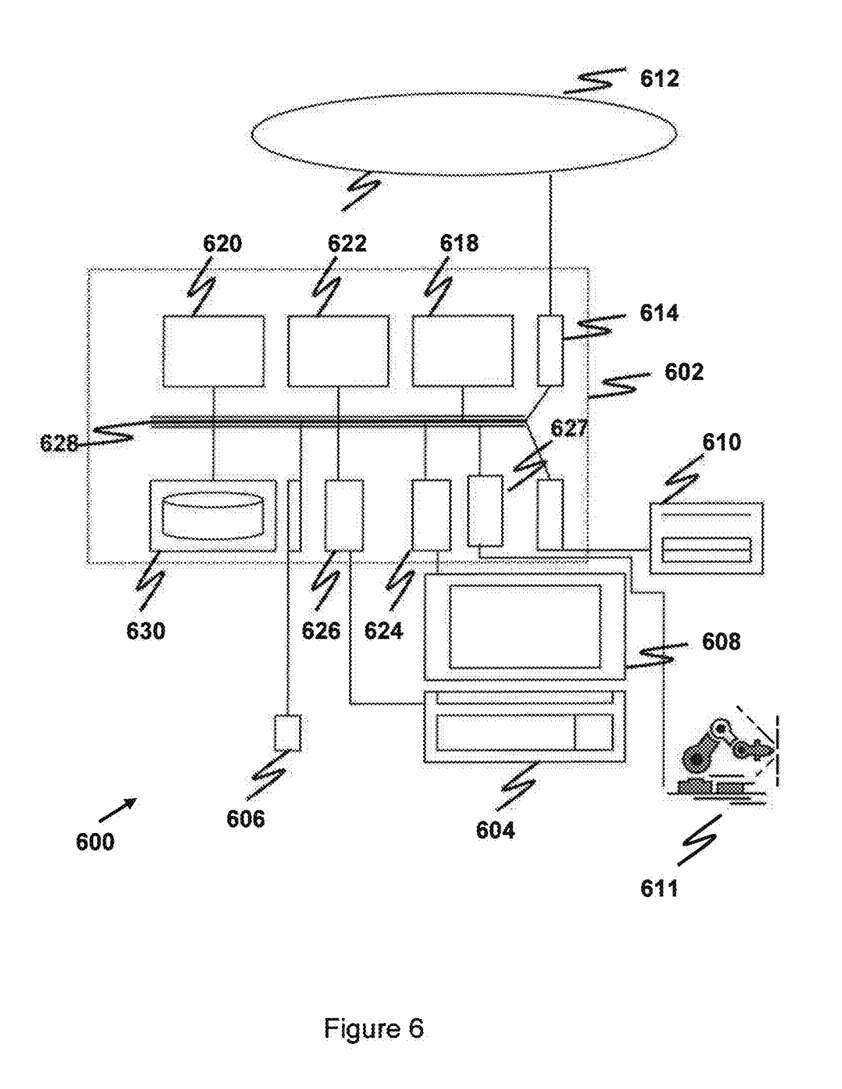
FIG. 6 illustrates a computer system upon which the method and system of the example embodiments can be implemented.

The method and system of the example embodiments can be implemented on a computer system 600, schematically shown in FIG. 6. It may be implemented as software, such as a computer program being executed within the computer system 600, and instructing the computer system 600 to conduct the method of the example embodiment.

The computer system 600 comprises a computer module 602, input modules such as a keyboard 604 and mouse 606 and a plurality of input and/or output devices such as a display 608, printer 610, and robot arm 611.

The computer module 602 is connected to a computer network 612 via a suitable transceiver device 614, to enable access to e.g. the Internet or other network systems such as Local Area Network (LAN) or Wide Area Network (WAN).

The computer module 602 in the example includes a processor 618, a Random Access Memory (RAM) 620 and a Read Only Memory (ROM) 622. The computer module 602 also includes a number of Input/Output (I/O) interfaces, for example I/O interface 624 to the display 608, I/O interface 626 to the keyboard 604, and I/O interface 627 to robot arm 611.

The components of the computer module 602 typically communicate via an interconnected bus 628 and in a manner known to the person skilled in the relevant art.

The application program is typically supplied to the user of the computer system 600 encoded on a data storage medium such as a CD-ROM or flash memory carrier and read utilising a corresponding data storage medium drive of a data storage device 630. The application program is read and controlled in its execution by the processor 618. Intermediate storage of program data maybe accomplished using RAM 620.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A surgical training system comprising:
   means for recording reference data representing a reference manipulation of a computer generated model of an object by a master user;
   a robotic device for moving along a recorded trajectory based on the recorded reference data to physically guide a trainee user during an assisted training manipulation of the model of the object by the trainee user;
   means for recording assessment data representing an assessment manipulation of the model of the object by the trainee user without guidance; and
   means for evaluating the assessment data based on the reference data.

2. The system as claimed in claim 1, further comprising processing means for generating the model of the object.

3. The system as claimed in claim 2, wherein said processing means is configured to generate a case specific model of the object based on patient data.

4. The system as claimed in claim 2, wherein the processing means comprises an image processing module for generating the model of the object based on images of a corresponding real object.

5. The system as claimed in claim 4, wherein the images comprise medical images for surgical training.

6. The system as claimed in claim 2, wherein the means for recording the reference data and the means for recording the assessment data together comprise one or more robotic devices.

7. The system as claimed in claim 6, wherein the one or more robotic devices are configured to be coupled to a tool used in the manipulation of the model of the object.

8. The system as claimed in claim 6, wherein the one or more robotic devices are configured to be coupled to the master user or the trainee user via the tool.

9. The system as claimed in claim 1, wherein the means for evaluating is configured to evaluate the assessment data based on one or more motion parameters.

10. The system as claimed in claim 9, wherein the motion parameters comprise one or more of a group consisting of maneuver route, speed, force, and time.

11. The system as claimed in claim 1, further comprising means for recording a training trajectory during an un-assisted training manipulation of the model of the object by the trainee user and correcting the training trajectory to the recorded trajectory when the training trajectory differs from the recorded trajectory by a predefined range.

12. A robot assisted surgical training method comprising the steps of:
    recording reference data representing a reference manipulation of a computer generated model of an object by a master user;
    physically guiding a trainee user using a robotic device, the robotic device moving along a recorded trajectory based on the recorded reference data during an assisted training manipulation of the model of the object by the trainee user;
    recording assessment data representing an assessment manipulation of the model of the object by the trainee user without guidance; and
    evaluating the assessment data based on the reference data.

13. The method as claimed in claim 12, further comprising the step of generating the model of the object.

14. The method as claimed in claim 13, wherein generating the model of the object comprises generating a case specific model of the object based on patient data.

15. The method as claimed in claim 13, comprising generating the model of the object based on images of a corresponding real object.

16. The method as claimed in claim 15, wherein the images comprise medical images for surgical training.

17. The method as claimed in claim 12, wherein recording the reference data and recording the assessment data comprise using one or more robotic devices.

18. The method as claimed in claim 17, wherein the one or more robotic devices are configured to be coupled to a tool used in the manipulation of the model of the object.

19. The method as claimed in claim 17, wherein the one or more robotic devices are configured to be coupled to the master user or the trainee user via the tool.

20. The method as claimed in claim 12, wherein evaluating the assessment data is based on one or more motion parameters.

21. The method as claimed in claim 20, wherein the motion parameters comprise one or more of a group consisting of maneuver route, speed, force, and time.

22. A non-transitory data storage medium having computer code means for instructing a computer to implement a robot assisted surgical training method as claimed in claim 12.

23. The method as claimed in claim 12, further comprising the step of recording a training trajectory during an un-assisted training manipulation of the model of the object by the trainee user and correcting the training trajectory to the recorded trajectory when the training trajectory differs from the recorded trajectory by a predefined range.

* * * * *